(12) United States Patent
Fang et al.

(10) Patent No.: US 11,753,511 B1
(45) Date of Patent: Sep. 12, 2023

(54) TEXTILE WASTE REGENERATED FLOORING AND PREPARATION METHOD THEREOF

(71) Applicant: Zhejiang Tianzhen Technology Co., Ltd., Huzhou (CN)

(72) Inventors: Qinghua Fang, Huzhou (CN); Wenjin Tang, Huzhou (CN)

(73) Assignee: Zhejiang Tianzhen Technology Co., Ltd., Huzhou (CN)

( * ) Notice: Subject to any disclaimer, the term of this patent is extended or adjusted under 35 U.S.C. 154(b) by 0 days.

(21) Appl. No.: 17/832,053

(22) Filed: Jun. 3, 2022

(30) Foreign Application Priority Data

Mar. 29, 2022 (CN) .......................... 202210317848.1

(51) Int. Cl.
*C08J 5/10* (2006.01)
*C08L 23/06* (2006.01)
(52) U.S. Cl.
CPC ................. *C08J 5/10* (2013.01); *C08L 23/06* (2013.01); *C08L 2205/16* (2013.01); *C08L 2207/20* (2013.01)
(58) Field of Classification Search
CPC ......... C08J 5/10; C08L 23/06; C08L 2205/16; C08L 2207/20

USPC .......................................... 524/427
See application file for complete search history.

(56) References Cited

FOREIGN PATENT DOCUMENTS

CN 113736278 A * 12/2021

OTHER PUBLICATIONS

L.A. Pruit, "1.23 Load-Bearing Medical Polymers (Non-Degradable)" in Comprehensive Biomaterials II, vol. 1, 2017, pp. 507-515. (Year: 2017).*

* cited by examiner

*Primary Examiner* — Ling Siu Choi
*Assistant Examiner* — Ronald Grinsted
(74) *Attorney, Agent, or Firm* — Fox Rothschild LLP

(57) ABSTRACT

Disclosed are a textile waste regenerated flooring and a preparation method thereof. The textile waste regenerated flooring is prepared from components including 30-50 parts by weight of a textile waste fiber, 30-50 parts by weight of an inorganic filler, and 10-30 parts by weight of polyethylene, wherein the textile waste fiber is prepared from a textile waste. In the disclosure, there is no limitation to the source of the waste textile through accurately controlling dosages of waste textile, inorganic filler and polyethylene.

8 Claims, 1 Drawing Sheet

TEXTILE WASTE REGENERATED FLOORING AND PREPARATION METHOD THEREOF

CROSS REFERENCE TO RELATED APPLICATION

This patent application claims the benefit and priority of Chinese Patent Application No. 202210317848.1, entitled "Textile waste regenerated flooring and preparation method thereof" filed on Mar. 29, 2022, the disclosure of which is incorporated by reference herein in its entirety as part of the present application.

TECHNICAL FIELD

The present disclosure relates to the technical field of floorings, in particular to a textile waste regenerated flooring and a preparation method thereof.

BACKGROUND ART

Textile wastes are from many sources. During the processing of clothing and raw materials, due to chemical operations and machining, waste fabrics are produced inevitably. These fabrics are less contaminated, and thus need a pre-treatment procedure which is relatively simple. Waste clothing, carpets, and bed sheets have become major sources of the textile wastes, and are of enormous quantity, resulting in that their recycling is time-consuming and laborious. However, no matter what kind of product, the recycling can save textile raw materials and reduce environmental pollution.

After the textile waste is discarded as trash, if it is incinerated, not only will coals, electric power, and other energy sources be consumed, but incineration will also produce a large quantity of pollutants, including carbon dioxide and ash after combustion; if it is landfilled, not only is the land occupied, but produced hazardous substances also contaminate water and soil. Therefore, in the prior art, regenerated chemical fibers are produced from the textile waste by a chemical method, and then used to manufacture regenerated fiberboard materials by carding, cross lapping, needle punching, and strengthening processes. However, this method has high requirements on raw materials of textile wastes, and it is necessary to sort out chemical fiber materials such as pure polyesters; raw materials of textile waste that are not chemical fiber materials cannot be recycled, which makes it impossible to realize a large-scale resource utilization of the textile waste.

SUMMARY

In view of the above, an object of the present disclosure is to provide a textile waste regenerated flooring and a preparation method thereof. In the present disclosure, a textile waste is used to prepare a flooring, and there is no limitation on the source of the textile waste, realizing a large-scale resource utilization of the textile waste.

To achieve the above object, the present disclosure provides the following technical solutions:

The present disclosure provides a textile waste regenerated flooring, which is prepared from components comprising 30-50 parts by weight of a textile waste fiber, 30-50 parts by weight of an inorganic filler, and 10-30 parts by weight of polyethylene, wherein the textile waste fiber is prepared from a textile waste.

In some embodiments, the textile waste regenerated flooring is prepared from components comprising 40 parts by weight of the textile waste fiber, 40 parts by weight of the inorganic filler, and 20 parts by weight of the polyethylene.

In some embodiments, the textile waste fiber is prepared by opening the textile waste and granulating in sequence.

In some embodiments, the inorganic filler is at least one selected from the group consisting of calcium carbonate and talc powder.

In some embodiments, the polyethylene has a number-average molecular weight of 40,000-300,000.

The present disclosure further provides a method for preparing the textile waste regenerated flooring as described in the above technical solutions, including the following steps:

mixing a textile waste fiber, an inorganic filler and polyethylene to obtain a mixture; and subjecting the mixture to a melt extrusion, a shaping, and a lamination sequentially to obtain the textile waste regenerated flooring.

In some embodiments, the melt extrusion is conducted at a temperature of 120-160° C.

In the present disclosure, there is no limitation to the source of the waste textile through accurately controlling dosages of waste textile, inorganic filler and polyethylene, and a large-scale resource utilization of the textile waste could be achieved. Moreover, the textile waste regenerated flooring could meet specific needs in appearance, and has a better decoration by controlling the type and color of materials; meanwhile, the textile waste regenerated flooring provided by the present disclosure has advantages of high strength, acoustic insulation and absorption, thermal insulation, and no pollution.

In the present disclosure, the method for preparing the textile waste regenerated flooring is simple and fast to complete, with fewer steps, favoring the realization of industrial production.

DETAILED DESCRIPTION OF THE EMBODIMENTS

Figure 1:
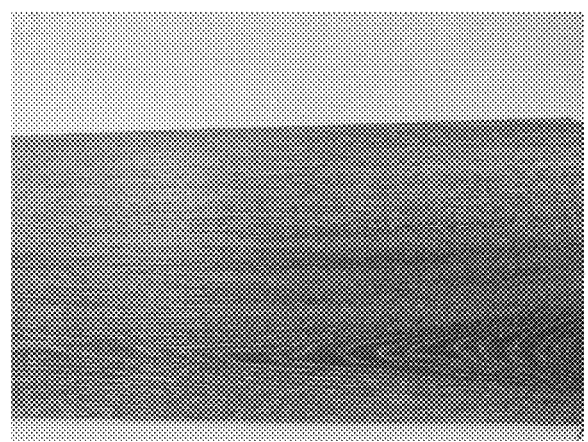
FIG. 1 is a pictorial diagram of the textile waste regenerated flooring prepared in Example 1.

The present disclosure provides a textile waste regenerated flooring, which is prepared from components comprising 30-50 parts by weight of a textile waste fiber, 30-50 parts by weight of an inorganic filler, and 10-30 parts by weight of polyethylene, wherein the textile waste fiber is prepared from a textile waste.

In the present disclosure, unless otherwise specified, all raw materials used are commercially available products in the art.

In some embodiments of the present disclosure, the textile waste regenerated flooring is prepared from components comprising 40 parts by weight of the textile waste fiber.

In some embodiments of the present disclosure, the textile waste is opened and granulated sequentially to obtain the textile waste fiber. There is no limitation to the specific modes for the opening and granulating in the present disclosure, and modes for the opening and granulating well known to those skilled in the art may be used.

In some embodiments of the present disclosure, the textile waste is a blended yarn.

In some embodiments of the present disclosure, in relative to the parts by weight of the textile waste fiber, the textile waste regenerated flooring is prepared from components comprising 40 parts by weight of the inorganic filler.

In some embodiments of the present disclosure, the inorganic filler is at least one selected from the group consisting of calcium carbonate and talc powder.

In some embodiments of the present disclosure, the inorganic filler has a particle size of 200-400 mesh.

In relative to the parts by weight of the textile waste fiber, the textile waste regenerated flooring is prepared from components comprising 20 parts by weight of the polyethylene.

In some embodiments of the present disclosure, the polyethylene has a number-average molecular weight of 40,000-300,000.

In some embodiments of the present disclosure, the polyethylene is a polyethylene waste.

In some embodiments of the present disclosure, the textile waste regenerated flooring is prepared from components comprising 40 parts by weight of the textile waste fiber, 40 parts by weight of the inorganic filler, and 20 parts by weight of the polyethylene.

The present disclosure further provides a method for preparing the textile waste regenerated flooring as described in the above technical solutions, including the following steps:

mixing a textile waste fiber, an inorganic filler and polyethylene to obtain a mixture; and subjecting the mixture to a melt extrusion, a shaping, and a lamination sequentially to obtain the textile waste regenerated flooring.

In some embodiments of the present disclosure, the melt extrusion is conducted at a temperature of 120-160° C.

In the present disclosure, there is no specific limitation to the mode for the mixing, shaping and lamination, and modes for the mixing, shaping and lamination well known to those skilled in the art may be used.

To further describe the present disclosure, the textile waste regenerated flooring and the preparation method thereof provided by the present disclosure are now described in detail below in conjunction with examples, which should not be construed as limiting the protection scope of the present disclosure.

EXAMPLES

Raw materials for preparing textile waste regenerated floorings in Examples 1 to 5 are shown in Table 1.

Table 1 Raw materials for preparing textile waste regenerated floorings in Examples 1 to 5 (parts by weight)

TABLE 1

Raw materials for preparing textile waste regenerated floorings in Examples 1 to 5 (parts by weight)

| | Textile waste fiber | Calcium carbonate | Polyethylene |
|---|---|---|---|
| Example 1 | 30 | 30 | 10 |
| Example 2 | 40 | 40 | 20 |
| Example 3 | 50 | 50 | 30 |
| Example 4 | 30 | 40 | 50 |
| Example 5 | 50 | 40 | 30 |

The preparation method of the textile waste regenerated floorings in Examples 1 to 5 was as follows:

The textile waste was opened and granulated sequentially, obtaining the textile waste fiber.

The textile waste fiber, the inorganic filler and polyethylene were mixed, and then subjected to a melt extrusion (at a temperature of 160° C.), a shaping, and a lamination sequentially, obtaining the textile waste regenerated flooring.

Figure 2:
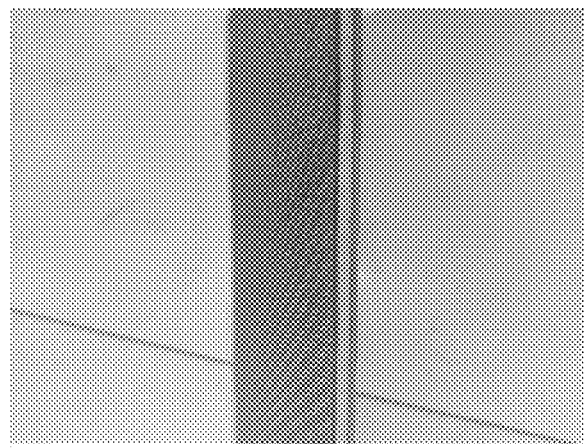
FIG. 2 is a pictorial diagram of the textile waste regenerated flooring prepared in Example 2.

FIG. 1 is a pictorial diagram of the textile waste regenerated flooring prepared in Example 1. FIG. 2 is a pictorial diagram of the textile waste regenerated flooring prepared in Example 2.

The textile waste regenerated floorings prepared in Example 1 to 5 were tested for the hardness, static load, bending strength, and noise reduction coefficient. Herein, the noise reduction coefficient was measured referring to GBJ47-1983. Results are shown in Table 2.

Table 2 The performance test results of textile waste regenerated floorings prepared in Examples 1 to 5

TABLE 2

The performance test results of textile waste regenerated floorings prepared in Examples 1 to 5

| | Hardness/D | Static load/mm | Bending strength/MPa | Noise reduction coefficient |
|---|---|---|---|---|
| Example 1 | 55 | 0.11 | 112 | 0.88 |
| Example 2 | 58 | 0.09 | 108 | 0.93 |
| Example 3 | 56 | 0.12 | 98 | 0.89 |
| Example 4 | 68 | 0.06 | 128 | 0.91 |
| Example 5 | 62 | 0.08 | 116 | 0.92 |

The above description is merely preferred embodiments of the present disclosure, and is not intended to limit the present disclosure in any form. It should be noted that a person of ordinary skill in the art may further make several improvements and modifications without departing from the principle of the present disclosure, and these improvements and modifications should be deemed as falling within the protection scope of the present disclosure.

What is claimed is:

1. A textile waste regenerated flooring, which is prepared from components comprising 40 parts by weight of a textile waste fiber, 40 parts by weight of an inorganic filler, and 20 parts by weight of polyethylene, or 50 parts by weight of a textile waste fiber, 40 parts by weight of an inorganic filler, and 30 parts by weight of polyethylene, wherein the textile waste fiber is prepared from a textile waste, and wherein the inorganic filler is calcium carbonate.

2. The textile waste regenerated flooring of claim 1, wherein the textile waste fiber is prepared by opening the textile waste and granulating sequentially.

3. The textile waste regenerated flooring of claim 1, wherein the polyethylene has a molecular weight of 40,000-300,000.

4. A method for preparing a textile waste regenerated flooring of claim 1, the textile waste regenerated flooring being prepared from components comprising 40 parts by weight of a textile waste fiber, 40 parts by weight of an inorganic filler, and 20 parts by weight of polyethylene, or 50 parts by weight of a textile waste fiber, 40 parts by weight of an inorganic filler, and 30 parts by weight of polyethylene, wherein the textile waste fiber is prepared from a textile waste, and
wherein the inorganic filler is calcium carbonate, and
wherein the method comprises the following steps:
mixing the textile waste fiber, the inorganic filler and the polyethylene to obtain a mixture; and
subjecting the mixture to a melt extrusion, a shaping, and a lamination sequentially to obtain the textile waste regenerated flooring.

5. The method of claim 4, wherein the melt extrusion is conducted at a temperature of 120-160° C.

6. The method of claim 4, wherein the textile waste fiber is prepared by opening the textile waste and granulating sequentially.

7. The method of claim 4, wherein the polyethylene has a molecular weight of 40,000-300,000.

8. The method of claim 6, wherein the melt extrusion is conducted at a temperature of 120-160° C.

\* \* \* \* \*